United States Patent [19]

Svensson

[11] Patent Number: 4,861,491

[45] Date of Patent: Aug. 29, 1989

[54] METHOD OF DETACKIFYING PAINT OVERSPRAY

[75] Inventor: Anders Svensson, Växjö, Sweden

[73] Assignee: NI Chemicals, Inc., Hightstown, N.J.

[21] Appl. No.: 201,193

[22] Filed: Jun. 2, 1988

[30] Foreign Application Priority Data

Jun. 15, 1987 [DE] Fed. Rep. of Germany ....... 3719929

[51] Int. Cl.$^4$ .............................. C02F 1/28; C02F 1/54
[52] U.S. Cl. ..................................... 210/691; 210/712; 210/728; 210/730
[58] Field of Search ............... 210/691, 708, 712, 728, 210/729, 917, 730; 134/38

[56] References Cited

U.S. PATENT DOCUMENTS

| | | | |
|---|---|---|---|
| 3,429,823 | 2/1969 | Cataneo | 252/170 |
| 3,723,148 | 3/1973 | Tupper | 106/287 PR |
| 4,067,806 | 1/1978 | Mauceri | 210/734 |
| 4,125,476 | 11/1978 | Dean | 252/115 |
| 4,185,970 | 1/1980 | Dean | 55/89 |
| 4,401,574 | 8/1983 | Farrington et al. | 210/728 |
| 4,440,647 | 4/1984 | Puchalski | 210/725 |
| 4,470,912 | 9/1984 | Beall | 210/691 |
| 4,473,477 | 9/1984 | Beall | 210/691 |
| 4,473,675 | 9/1984 | Knudson, Jr. et al. | 523/508 |
| 4,504,395 | 3/1985 | Harpel et al. | 210/712 |
| 4,517,094 | 5/1985 | Beall | 210/66.4 |
| 4,549,966 | 10/1985 | Beall | 210/661 |
| 4,564,464 | 1/1986 | Harpel et al. | 252/181 |
| 4,569,923 | 2/1986 | Knudson, Jr. et al. | 501/148 |
| 4,623,398 | 11/1986 | Goodman et al. | 106/308 N |
| 4,629,572 | 12/1986 | Leitz et al. | 210/714 |
| 4,631,091 | 12/1986 | Goodman | 106/308 N |
| 4,637,824 | 1/1987 | Pominville | 210/725 |
| 4,650,590 | 3/1987 | Beall | 210/691 |
| 4,664,842 | 5/1987 | Knudson, Jr. et al. | 252/315.2 |
| 4,670,993 | 6/1987 | Dunaway et al. | 34/10 |
| 4,678,517 | 7/1987 | Dunaway | 106/309 |
| 4,683,259 | 7/1987 | Goodman | 524/447 |
| 4,690,868 | 9/1987 | Rice | 428/409 |
| 4,693,427 | 9/1987 | Bilimoria et al. | 241/23 |
| 4,695,511 | 9/1987 | Goodman et al. | 428/404 |
| 4,717,559 | 1/1988 | Cummings et al. | 423/328 |
| 4,743,305 | 5/1988 | Doidge et al. | 106/308 N |
| 4,743,306 | 5/1988 | Jepson et al. | 106/308 N |

Primary Examiner—Ivars Cintins
Attorney, Agent, or Firm—Burns, Doane, Swecker & Mathis

[57] ABSTRACT

A method of detackifying paint overspray formed of paint particles and water is disclosed. The method involves contacting the overspray with a defined organophilic clay and separating the detackified paint particles from the water.

13 Claims, No Drawings

METHOD OF DETACKIFYING PAINT OVERSPRAY

The invention relates to the use of an organophilic clay as an agent for separating the organic phase from oil-in-water suspensions, i.e. suspensions of organic materials in water or aqueous solutions.

In industrial processes, in the elimination of organic impurities and in a large number of wash processes, suspensions of water-insoluble organic materials in an aqueous phase are obtained, the organic phase being in the form of fine particles and frequently in colloidal form in the said suspensions. The separation of such suspensions is extremely difficult.

One example of such a suspension of an organic phase in an aqueous phase is the aqueous wash liquid which is obtained in paint-processing industries when sprayed paint is washed out of the waste air from spray booths with water. Particularly in automotive coating in so-called spray booths or spray stands or on spray walls, a paint mist is formed, which is removed from the air by washing out with water. The water for washing out the paint mist is circulated, with the result that a more and more concentrated paint suspension in water is formed, so that it is necessary to detackify or coagulate this suspension. Alkaline compounds which effect denaturing of the paints and hence coagulation have already been used for this purpose (Jurgen Geke "Moderne Produkte und Verfahren zur Koagulation" (Modern Products and Processes for Coagulation), Oberflache +JOT 1986, 11, pages 43–46).

Finally, German Offenlegungsschrift 34 21 270 discloses that an aqueous suspension of hydrate of lime obtained from marble can be used for precipitating, detackifying and coagulating underbody protection based on waxes, wax-like plastics and plastic dispersions and on enamel resin coats in paint mist wet separators.

European Patent Application No. 0 187 028 describes a process for detackifying and separating the washed-out paint spray from the aqueous wash liquid, in which process an aqueous slurry which contains a predominant amount of hectorite and a small amount of a diluent is added to the aqueous paint suspension. In addition, the suspension may contain water-soluble polyphosphate, alumina, montmorillonite clay and antifoams.

Is was furthermore known that bentonite clay can be used for coagulating and detackifying an aqueous paint suspension of this type (H. Kohler, Fachbroschure Oberflachentechnik (Technical Brochure on Surface Technology) 5/85, pages 65–69.

The clays used to date for detackifying and coagulating coatings and paints in aqueous suspensions are hydrophilic inorganic compounds which are added to the aqueous suspensions in the form of an aqueous slurry. However, the separation effect achieved is still unsatisfactory and, moreover, the addition of the hydrophilic clays which swell in water results in an undesirable increase in the viscosity of the aqueous phase.

Accordingly, the object of the invention is to provide an adsorbent for separating the organic phase from oil-in-water suspensions, in particular for separating and detackifying the suspensions of coatings and paints in aqueous wash liquids, in which effective and complete separation is achieved without the aqueous phase suffering an undesirable increase in viscosity.

This object is achieved, according to the invention, by using an organophilic clay as an adsorbent for separating the organic phase from oil-in-water susspensions.

The purely inorganic clays used in the prior art are hydrophilic and possess good suspendability and swellability in an aqueous medium. Their action as adsorbents for separating the organic phase from an aqueous coating suspension is therefore easy to understand. On the other hand, it was surprising that the organophilic clays which are used according to the invention and are water-repellent do not swell in water and tend to settle out immediately in the aqueous phase, exhibit an excellent adsorption effect in a suspension of an organic phase, such as a paint, in an aqueous medium, and moreover do not lead to an increase in viscosity in this medium.

The organophilic clays used according to the invention are reaction products of an organic cationic compound with a clay of the smectite type which has a cation exchange capacity of at least 75 milliequivalents per 100 g of the clay.

The clays used as a starting material for the preparation of the organophilic clays are of the smectite type and have a cation exchange capacity of at least 75 milliequivalents per 100 g of the clay. Particularly advantageous clays are naturally occurring Wyoming varieties of swelling bentonites and similar clays, as well as hectorite, a swelling magnesium lithium silicate clay.

The cation exchange capacity of the clays of the smectite type can be determined by the known ammonium acetate method. The clays used as the starting material, especially clays of the bentonite type, are advantageously converted to the sodium form unless they are already in this form. This can advantageously be done by preparing an aqueous clay slurry and passing the clay slurry through a bed of cation exchanger resin in the sodium form. In another method, the clay is mixed with water and a water-soluble sodium compound, such as a sodium carbonate, sodium hydroxide and the like is added, after which the mixture is subjected to a shearing action in a pugmill or an extruder.

Naturally occuring or synthetic clays of the smectite type, which have been obtained either by a pneumatic or, preferably, a hydrothermal method of synthesis, can likewise be used for the preparation of the organophilic clays used according to the invention. Typical examples of such clays are montmorillonite, bentonite, hectorite, beidellite, saponite and stevensite. Synthetic clays can be prepared by hydrothermal synthesis, by using an aqueous reaction mixture in the form of a slurry which contains mixed hydrous oxides or hydroxides of the desired metal and, if necessary, sodium (or another exchangeable cation or a mixture of cations) in the form of the fluoride in the proportions present in the specific synthetic smectite desired. The slurry is then introduced into an autoclave and heated under autogeneous pressure to a temperature in the range from about 100 to 325° C., preferably 274 to 300° C., for a time sufficient to form the desired product.

The organic cationic compounds which are suitable for the preparation of the clays which are organically modified and hence organophilic can be selected from a wide range of compounds which are capable of cation exchange with a clay of the smectite type and thus lead to the formation of an organophilic clay. The organic cationic compound must have a positive charge which is localized on a single atom or on a small group of atoms in the compound. The organic cation is preferably selected from the group consisting of the quaternary ammonium salts and phosphonium salts and mixtures of such onium compounds and equivalent salts.

The organic cation is preferably an ammonium cation which contains at least one lineal or branched, saturated or unsaturated alkyl group having 12 to 22 carbon atoms. The remaining groups of the cation are chosen from (a) lineal or branched alkyl groups having 1 to 22 carbon atoms; (b) aralkyl groups which are benzyl and substituted benzyl moieties including fused ring moieties having lineal or branched 1 to 22 carbon atoms in the alkyl portion of the structure; (c) aryl groups such as phenyl and substituted phenyl including fused ring aromatic substituents; (d) beta, gamma, unsaturated groups having six or less carbon atoms or hydroxyalkyl groups having two to six carbon atoms; and (e) hydrogen.

The long chain alkyl radicals may be derived from natural occurring oils including various vegetable oils, such as corn oil, coconut oil, soybean oil, cottonseed oil, castor oil and the like, as well as various animal oils or fats such as tallow oil. The alkyl radicals may likewise be petrochemically derived such as from alpha olefins.

Representative examples of useful branched, saturated radicals include 12-methylstearyl; and 12-ethylstearyl. Representative examples of useful branched, unsaturated radicals include 12-methyloleyl and 12-ethyloleyl. Representative examples of unbranched saturated radicals include lauryl; stearyl; tridecyl; myristyl (tetradecyl); pentadecyl; hexadecyl; hydrogenated tallow, docosanyl. Representative examples of unbranched, unsaturated and unsubstituted radicals include oleyl, linoleyl, linolenyl, soya and tallow.

Additional examples of aralkyl, that is benzyl and substituted benzyl moieties would include those materials derived from, e.g. benzyl halides, benzhydryl halides, trityl halides, α-halo-α-phenylalkanes wherein the alkyl chain has from 1 to 22 carbon atoms, such as 1-halo-1-phenylethane, 1-halo-1-phenyl propane, and 1-halo-1-phenyloctadecane; substituted benzyl moieties, such as would be derived from ortho, meta and para-chlorobenzyl halides, para-methoxybenzyl halides, ortho, meta and para-nitrilobenzyl halides, and ortho, meta and para-alkylbenzyl halides wherein the alkyl chain contains from 1 to 22 carbon atoms; and fused ring benzyl-type moieties, such as would be derived from 2-halomethylnaphthalene, 9-halomethylanthracene and 9-halomethylphenanthrene, wherein the halo group would be defined as chloro, bromo, iodo, or any other such group which serves as a leaving group in the nucleophilic attack of the benzyl type moiety such that the nucleophilic replaces the leaving group on the benzyl type moiety.

Examples of aryl groups would include phenyl such as in N-alkyl and N,N-dialkyl anilines, wherein the alkyl groups contain between 1 and 22 carbon atoms; ortho, meta and paranitrophenyl, ortho, metal and para-alkyl phenyl, wherein the alkyl group contains between 1 and 22 carbon.atoms, 2-, 3-, and 4-halophenyl wherein the halo group is defined as chloro, bromo, or iodo, and 2-, 3-, and 4-carboxyphenyl and esters thereof, where the alcohol of the ester is derived from an alkyl alcohol, wherein the alkyl group contains between 1 and 22 carbon atoms, aryl such as a phenol, or aralkyl such as benzyl alcohols; fused ring aryl moieties such as naphthalene, anthracene, and phenarthene.

The β,γ-unsaturated alkyl group may be selected from a wide range of materials. These compounds may be cyclic or acyclic, unsubstituted or substituted with aliphatic radicals containing up to 3 carbon atoms such that the total number of aliphatic carbons in the β,γ-unsaturated radical is 6 or less. The β,γ-unsaturated alkyl radical may be substituted with an aromatic ring that likewise is conjugated with the unsaturation of the β,γ moiety or the β,γ-radical is substituted with both aliphatic radicals and aromatic rings.

Representative examples of cyclic β,γ-unsaturated alkyl groups include 2-cyclohexenyl and 2-cyclopentenyl. Representative examples of acyclic β,γ-unsaturated alkyl groups containing 6 or less carbon atoms include propargyl; allyl(2-propenyl); crotyl(2-butenyl); 2-pentenyl; 2-hexenyl; 3-methyl-2-butenyl; 3-methyl-2-pentenyl; 2,3-dimethyl-2-butenyl; 1,1-dimethyl-2-propenyl; 1,2-dimethyl propenyl; 2,4-pentadienyl; and 2,4-hexadienyl. Representative examples of acyclic-aromatic substituted compounds include cinnamyl(3-phenyl-2-propenyl); 2-phenyl-2-propenyl; and 3-(4 methoxyphenyl)-2-propenyl. Representative examples of aromatic and aliphatic substituted materials include 3-phenyl-2-cyclohexenyl; 3-phenyl-2-cyclopentenyl; 1,1-dimethyl-3-phenyl-2-propenyl; 1,1,2-trimethyl-3-phenyl-2-propenyl; 2,3-dimethyl-3-phenyl-2-propenyl; 3,3-dimethyl-2-phenyl-2-propenyl; and 3-phenyl-2-butenyl.

The hydroxyalkyl group is selected from a hydroxyl substituted aliphatic radical wherein the hydroxyl is not substituted at the carbon adjacent to the positively charged atom, and the group has from 2 to 6 aliphatic carbons. The alkyl group may be substituted with an aromatic ring independently from the 2 to 6 aliphatic carbons. Representative examples include 2-hydroxyethyl (ethanol); 3-hydroxypropyl; 4-hydroxypentyl; 6-hydroxyhexyl; 2-hydroxypropyl (isopropanol); 2-hydroxybutyl; 2-hydroxypentyl; 2-hydroxyhexyl; 2-hydroxycyclohexyl; 3-hydroxycyclohexyl; 4-hydroxycyclohexyl; 2-hydroxycyclopentyl; 3-hydroxycyclopentyl; 2-methyl-2-hydroxypropyl; 1,1,2-trimethyl-2-hydroxypropyl; 2-phenyl-2-hydroxyethyl; 3-methyl-2-hydroxybutyl; and 5-hydroxy-2-pentenyl.

The organic cation can thus be considered as having at least one of the following formulae:

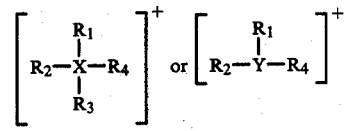

wherein X is nitrogen or phosphorus, Y is sulfur, $R_1$ is the long chain alkyl group and $R_2$, $R_3$ and $R_4$ are representative of the other possible groups described above.

A preferred organic cation contains at least one lineal or branched, saturated or unsaturated alkyl group having 12 to 22 carbon atoms and at least one lineal or branched, saturated or unsaturated alkyl group having 1 to 12 carbon atoms. A preferred organic cation may also have at least one aralkyl group having lineal or branched, saturated or unsaturated alkyl group having 1 to 12 carbons in the alkyl portion.

Especially preferred organic cations are ammonium cations where $R_1$, $R_2$, $R_3$, and $R_4$ are defined as follows:

| $R_1$ | $R_2$ | $R_3$ | $R_4$ |
|---|---|---|---|
| Methyl | Methyl | Long Chain Alkyl | Long Chain Alkyl |
| Methyl | Methyl | Benzyl | Long Chain Alkyl |

-continued

| R₁ | R₂ | R₃ | R₄ |
|---|---|---|---|
| Methyl | Benzyl | Long Chain Alkyl | Long Chain Alkyl |

As is apparent from the previous discussion, the long chain alkyl radicals may be derived from natural occurring oils including various vegetable oils, such as corn oil, coconut oil, soybean oil, cottonseed oil, castor oil and the like, as well as various animal oils or fats such as tallow oil. The alkyl radicals may likewise be petrochemically derived such as from alpha olefins.

The alkyl radicals contained in the commercial quaternary compounds used in this invention are prepared from hydrogenated tallow fatty acids. As such, they are a mixture of alkyl radicals having from 14 to 20 carbon atoms, wherein 20 to 35% have 16 carbon atoms and 60 to 75% have 18 carbon atoms, 100% basis. The salt anion is preferably selected from the group consisting of chloride and bromide, and mixtures thereof, and is more preferable chloride, although other anions such as acetate, hydroxide, etc. may be in the quaternary ammonium to neutralize the quaternary ammonium cation.

The amount of organic cation reacted with the smectite-type clay depends upon the specific clay and the desired degree of hydrophobicity. Typically, the amount of cation ranges from about 90 to about 150%, preferably from about 100 to about 130% of the cation exchange capacity of the clay. Thus, for example, when bentonite is used, the amount of cation reacted with the clay will range from about 85 to about 143 milliequivalents, preferably from about 95 to about 124 milliequivalents per 100 grams of clay, 100% active basis.

The anion which will normally accompany the organic cation is typically one which will not adversely affect the reaction product or the recovery of the same. Such anions may be exemplified by chloride, bromide, iodide, hydroxyl, nitrite and acetate in amounts sufficient to neutralize the organic cation.

The preparation of the organic cationic salt (i.e., the organic cation paired with the anion) can be achieved by techniques well known in the art. For example, when preparing a quaternary ammonium salt, one skilled in the art would prepare a dialkyl secondary amine, for example, by the hydrogenation of nitriles, see U.S. Patent No. 2,355,356, and then form the methyl dialkyl tertiary amine by reductive alkylation using formaldehyde as a source of the methyl radical. According to procedures set forth in U.S. Pat. No. 3,136,819 and U.S. Pat. No. 2,775,617, quaternary amine halide may then be formed by adding benzyl chloride or benzyl bromide to the tertiary amine. The contents of these three patents are hereby incorporated by reference.

As is well known in the art, the reaction with benzyl chloride or benzyl bromide can be completed by adding a minor amount of methylene chloride to the reaction mixture so that a blend of products which are predominantly benzyl substituted is obtained. This blend may then be used without further separation of components to prepare the organophilic clay.

Illustrative of the numerous patents which describe organic cationic salts, their manner of preparation and their use in the preparation of organophilic clays are commonly assigned U.S. Pat. Nos. 2,966,506, 4,081,496, 4,105,578, 4,116,866, 4,208,218, 4,391,637, 4,410,364, 4,412,018, 4,434,075, 4,434,076, 4,450,095 and 4,517,112, the contents of which were incorporated by reference.

While not preferred, the organophilic clay gellant of the present invention may also be the reaction product of the smectite-type clay, an organic cation and an organic anion. The organic anion is selected from a wide range of materials which are capable of reacting with the organic cation in order to form an organic cation/organic anion complex which may be intercalated with the smectite-type clay. The molecular weight (gram molecular weight) of the organic anion is preferably 3,000 or less, and most preferably 1,000 or less and contains at least one acidic moiety per molecule so as to permit the formation of the organic cation/organic anion complex. The organic anion is preferably derived from an organic compound having a $pK_A$ less than about 11.0.

Preferable organic anions are derived from carboxylic acids, such as stearic acid, sulfonic acids and alkyl sulfates, such as the lauryl half ester of sulfuric acid, with an especially preferred anion being stearate particularly where the organophilic clay gellant is designed for thickening a polyester composition.

The organic anion, which includes mixtures of organic anions, is reacted with the organic cation and smectite-type clay to form the organophilic clay and may be added to the reaction mixture in acid or salt form. Exemplary of the latter form are alkali metal salts, alkaline earth salts, ammonium and organic amines.

Representative salts are those formed with hydrogen, lithium, sodium, potassium, magnesium, calcium, barium, ammonium and organic amines such as ethanolamine, diethanolamine, triethanolamine, methyldiethanolamine, butyldiethanolamine, diethylamine, dimethylamine, triethylamine, dibutylamine, and so forth, and mixtures thereof. The most preferred salt is formed with sodium.

The amount of organic anion reacted with smectite-type clay and the organic cation is sufficient to obtain a milliequivalent ratio of organic cation to organic anion in the range of from about 1.70:1.0 to about 28:1.0, preferably from about 3.0:1.0 to about 12:1.0. Of course the most preferred ranges depend on the particular organic cation and organic anion and the intended environment of use and can be determined by experimentation guided by the information set forth above. A most preferred range for organophilic clay gellants of the present invention designed for polyester compositions have an organic cation to organic anion ratio in the range of from about 4.0:1.0 to about 6.0:1.0. To illustrate the foregoing general principle, where the smectite-type clay is bentonite and the amount of organic cation is 102 milliequivalents, from about 5 to about 50 milliequivalents, preferably from about 10 to about 30 milliequivalents of anion, such as stearate, per 100 grams of clay, 100% active basis is reacted with the clay and the organic cation. Illustrative patents which describe suitable organic anions which may be co-reacted with the organic cation and the smectite-type clay in order to form the organophilic clay include commonly assigned U.S. Pat. Nos. 4,412,018, 4,434,075 and 4,517,112, the contents of all of which are incorporated by reference. The organophilic clays used according to the invention can be prepared by any method suitable for the production of organophilic clays. This can typically be achieved by mixing the clay, the quaternary onium compound (ammonium compound), the organic anion, if present, water and optionally a small amount of a water miscible organic solvent, such as isopropyl alcohol, with one another at a temperature of, preferably, in the range from 20 to 100° C. and in particular from 35 to 77° C. for a time sufficient for the organic compound to react with the clay particles, after which the material can be filtered off, washed, dried and milled. If the organophilic clays are used in the form of slurries, the drying and milling stage can be omitted with any desired additives subsequently incorporated. The clay is preferably dispersed in water in a concentration of about 1 to 8%, preferably 2 to 7%, the slurry obtained is, if necessary, centrifuged in order to remove impurities which do not consist of clay, and which account for about 10% of the starting clay composition, and the slurry is stirred, and heated to a temperature in the range from 35° to 77° C. The quaternary ammonium salt and, if present, the organic anion, are then added in the desired amount, stated in milliequivalents. They are preferably added in the form of a liquid in isopropanol or in the form of a dispersion in water, and stirring is continued in order to carry out the reaction.

To permit more convenient handling, it is preferable for the total content of the organic component in the organophilic clay reaction products according to the invention to be less than about 50% by weight of the clay modified with the organic component. Although it is possible to use a reaction product having a higher content, the reaction product is difficult to filter, to dry and to mill.

According to the invention, bentonite or hectorite which has been modified with an organic component has proven particularly advantageous.

When the organophilic clay is used according to the invention for separating the oil phase or the organic phase from a suspension, the organophilic clay can be employed either as such in powder form or in the form of an aqueous slurry. The powdered form of the organoclay can be in any particle size which can be thoroughly mixed with the suspension, A preferred form is a powder which meets a specification of 95 % less than 75 microns. When an aqueous slurry is used, the solids content of this slurry can be in the range from about 10 to 70% by weight, preferably 30 to 60% by weight, and a slurry having a solids content of 40 to 50% by weight is particularly preferred. The slurry may furthermore contain conventional additives, such as wetting agents or preservatives which are known per se. Suitable wetting agents are conventional cationic, anionic or nonionic surfactants. Stabilizers may be added to the slurry in order to prevent the suspended particles from settling out and are therefore useful in the preparation of storable slurries. Known agents for preventing the settling out of aqueous suspensions are suitable for this purpose, such as those which are known, for example, from the coatings and paints sector. Suitable examples of this include water-soluble and water-swellable polymers, celluloses and cellulose derivatives, hydrophilic clays which are unmodified or modified by organic components. If the organophilic clay is employed as such in powder form for the intended use according to the invention, it is of course also possible to use the pulverulent organophilic clay in combination with one of the stated additives. In each instance, the additives are added in amount selected to achieve the intended function of the additive.

The organophilic clay used according to the invention is added to the oil-in-water suspension to be separated in an amount which depends on the concentration of the organic phase in the suspension.

Where used specifically for separating coating droplets from the aqueous phase which has been obtained by washing out the paint, enamel, lacquer, etc. overspray from spray booths, the ratio of clay modified with an organic component to coating droplets is advantageously 0.05:1 to 0.3:1, in particular 0.1:1 to 0.2:1 (weight ratio).

The organophilic clay according to the invention is suitable for separating the organic phase from almost any suspension of organic materials in water, i.e. from so-called oil-in-water suspensions. Illustrative suspensions include oil spin suspensions, suspensions resulting from machine cuttings, industrial wastes and used lubricants and coolants.

A particularly advantageous use is the separation of oil-in-water suspensions which are obtained by washing out the overspray in spray booths, in particular in automotive paintshops. Particularly advantageous for this application is a suspension of the organophilic clay which has a solids content of 45% and contains about 0.1% of wetting agent (sulfonate-based wetting agent) and 0.5% of a stabilizer.

The organophilic clay, preferably in slurry form, is advantageously added to the circulation water of the spray booth with vigorous mixing. This can be effected, for example, with the aid of a Venturi tube. The coating droplets, the so-called overspray, which pass into the water during the spray process are then coagulated by the organophilic clay. The amount added depends on the type of coating and on the amount of coating in aqueous suspension. The ph of the circulating water is adjusted to a pH of 3 to 7 and preferably to 3 to 5. This can be achieved by the addition of an acidic material and especially a weak acid such as acetic. The resulting sludge, which comprises the organophilic clay, the coating particles and water, separates off and can be removed from the circulation water via a decanter, filter, centrifuge or other suitable apparatus. The circulation water thus remains substantially free of paint impurities. Moreover, the viscosity of the circulation water does not increase. This is an extremely important advantage of the use according to the invention in comparison with non-modified clays used to date. After it has been separated off and dried, the sludge is in the form of non-tacky granules.

The invention is illustrated in detail below with reference to Examples.

The products used in the Examples are as defined below: Orotan 731, 25% strength in water (dinaphthylmethane sulfonate wetting agent (Rohm & Haas Deutschland GmbH, Frankfurt)

Mergal K6N - preservative

N-methylolchloroacetamides combined with heterocyclic compounds (Riedel de Haen, Selze)

EA 285 - stabilizer (KRONOS TITAN-GmbH, Leverkusen) hectorite clay mixed with cellulosic material Silicone antifoam SRE - (wetting agent from Wacker)

Byk 155, 35% strength - wetting agent (Byk Chemie, Wesel) low molecular weight acrylate copolymer Byk 181 - wetting agent (Byk Chemie, Wesel) alkylolammonium salt of a polyfunctional polymer of anionic/nonionic character Coatex OP 10 - wetting agent (Dimed GmbH, Cologne) phosphoric acid ester Nopco Colorsperse 188-A - wetting agent (Munzing Chemie GmbH, Heilbronn) mixture of specific polyglycol esters Clays modified with organic components BENTONE ® 34: bentonite, modified with bis (hydrogenated tallow alkyl)-dimethylammonium chloride.

BENTONE 38: hectorite, modified with bis-hydrogenated tallow alkyl)-dimethylammonium chloride.

BENTONE 27: hectorite, modified with benzyl-(hydrogenated tallow alkyl)dimethylammonium chloride.

EXAMPLE 1

The components below were mixed with the aid of a high-speed stirrer, with constant stirring, a thoroughly dispersed homogeneous stable slurry being obtained:

817.50 g of water
6.75 g of Orotan 731, 25% strength
1.50 g of K6N
663.00 g of BENTONE 38
8.25 g of EA 285
3.00 g of silicone antifoam SRE

EXAMPLE 2

A slurry was prepared similarly to Example 1 from the components stated there, but BENTONE 38 was replaced with BENTONE 34. A stable slurry was obtained.

EXAMPLE 3

Example 1 was repeated, except that BENTONE 38 was replaced with BENTONE 27.

The slurries prepared in Examples 1, 2 and 3 were tested in a simulated spray system with trickling water by the following method.

A tank having a capacity of 12 l was connected to a circulating pump. A 75 cm high glass panel was placed vertically in the tank. The water was circulated from the tank to the upper edge of the glass panel and flowed from there in such a way that a curtain of water was formed over the entire surface; paint was sprayed from an automatic flat-jet spray gun with a 0.8 mm nozzle against the said curtain of water (150 g of paint in 20 minutes under a pressure of 1 bar).

The organophilic clay-containing slurry was introduced into the water manually. The low-speed disperser dispersed the paint and slurry in the tank.

After the end of the spray process, the tank content was sieved and dried. The coagulated paint particles should be non-tacky and should dry in the form of granules.

A polyurethane filler generally believed to be very difficult to coagulate was tested by the stated method. The organophilic clay according to the invention was found to be very effective. The results are summarized in the table below:

TABLE I

| Results: | BENTONE 38 Example 1 | BENTONE 34 Example 2 | BENTONE 27 Example 3 |
|---|---|---|---|
| Dispersibility in water | very good | very good | very good |
| Detackifying the overspray | very good | good | good |
| Sedimentation downward | 90% | 60% | 100% |
| upward | 10% | 40% | |
| Appearance after drying | small granules | large granules | large granules |

The following coatings were detackified in the manner described above, using the suspension obtained in Example 1:

1. bluish gray dry grinding baking filler (PU-based) from Mehnert and Veek
2. conventional metallic base coat from Herberts
3. conventional clear coat from Herberts
4. conventional solid red from Herberts
5. solid red waterborne finish from Herberts
6. metallic gray waterborne finish from Herberts In the case of the waterborne finishes, the pH of the circulation water was brought to 3 with acetic acid. All paints were thoroughly detackified at a paint/coagulant ratio of 3:1.

EXAMPLE 4

Another suspension was prepared by mixing the following components:

```
54.62%   of water
 0.45%   of Orotan 731, 25% strength
 0.10%   of K6N
44.28%   of BENTONE 38
 0.55%   by EA 285
100.00%
```

This gave a stable suspension which was readily dispersible in the circulation water. The suspension thus obtained was tested in a large-scale plant in an automotive spray shop and found to have good detackifying properties.

What is claimed:

1. A method of detackifying paint overspray comprised of paint particles and wash water, said method comprising contacting the overspray with an organophilic clay to detackify the paint particles, said organophilic clay being the reaction product of a smectite-type clay with ammonium cation containing at least one lineal or branched, saturated or unsaturated alkyl group having 12 to 22 carbon atoms, said ammonium cation being in an amount ranging from about 90 to about 150% of the cation exchange capacity of said smectite-type clay and separating the detackified paint particles from the wash water.

2. The method of claim 1 wherein the smectite-type clay is bentonite or hectorite.

3. The method of claim 1 wherein the organophilic clay is in the form of an aqueous slurry having a solids content of 10 to 70 % by weight.

4. The method of claim 3 wherein the aqueous slurry has a solids content of 30 to 60 % by weight.

5. The method of claim 3 wherein the aqueous slurry has a solids content of 40 to 50 % by weight.

6. The method of claim 1 wherein the organophilic clay is contacted with the overspray in the presence of a wetting agent.

7. The method of claim 1 wherein the weight ratio of the organophilic clay to the paint is from 0.05:1 to 0.3:1.

8. The method of claim 7 wherein the weight ratio of the organophilic clay to the paint is from 0.1:1 to 0.2:1.

9. The method of claim 1 wherein the pH of the wash water is in the range of 3 to 7.

10. The method of claim 1 wherein the pH of the wash water is in the range of 3 to 5.

11. The method of claim 1 wherein the organophilic clay is the reaction product of a smectite-type clay and an ammonium compound that has two methyl groups and two long chain alkyl groups.

12. The method of claim 1 wherein the organophilic clay is the reaction product of a smectite type clay and an ammonium compound that has two methyl groups, a benzyl group and a long chain alkyl group.

13. The method of claim 1 wherein the organophilic clay is the reaction product of a smectite-type clay and an ammonium compound that has a methyl group, a benzyl group and two long chain alkyl groups.

* * * * *